Patented Jan. 11, 1949

2,459,002

UNITED STATES PATENT OFFICE 2,459,002

PREPARATION OF ACYL-NITROARYLIDES

Robert Prescott Parker and Richard Franklin Reeves, Somerville, and Robert Carland Conn, Bound Brook, N. J., assignors to American Cyanamid Company, New York, N. Y., a corporation of Maine No Drawing. Application September 26, 1944, Serial No. 555,894

10 Claims. (Cl. 260—556)

This invention relates to a new method of preparing acylnitroarylides and the corresponding nitroamines.

Acylnitroarylides of the benzene series are intermediates for the corresponding nitroamines and monoacyl arylene diamines which are important intermediates for azo dyestuffs.

In the past these products have been prepared by the usual methods, that is to say, by nitrating the acylarylide with nitric acid diluted with water or water miscible acids such as sulfuric or acetic acid. When the nitration is effected with nitric and sulfuric acid the preparation of the acylarylide has to be carried out in a different medium and the product isolated prior to nitration. When acetic acid is used an expensive recovery problem is presented because the acetic acid is too expensive to throw away.

According to the present invention it has been found that if the acylarylide is in solution in water immiscible inert organic solvent nitration can be effected with nitric acid alone. This is a most surprising result, as it is normally considered necessary to associate the nitric acid with substances such as sulfuric or glacial acetic acids which serve to unite with or dilute the water produced in the reaction. It is not intended to limit the present invention to any particular theory of action, but it is our belief that possibly the nitric acid dissolves in the organic solvent in its anhydrous, non-ionized form in small amount and reacts there, disassociated from water, and the water of reaction produced enters the separate water phase. It is possible that other factors enter into the reaction but the above explanation appears most probably in the light of the known facts.

A further and in many cases the most important and practical advantage of the present invention lies in the fact that it is not necessary to separately produce and isolate the acylarylide. On the contrary it may be formed from the corresponding amine in the same water immiscible inert organic solvent and the reaction product without any further isolation of the acylarylide may then be nitrated with nitric acid alone, as described above, and if it is desired to produce the nitroamine rather than the acylnitroarylide hydrolysis may also be effected without isolation. The possibility of carrying out two or three steps in the same equipment without the necessity of isolation of the intermediate products represents an important economical advantage of this preferred modification of the present invention.

When it is desired to produce the acylarylide in the same inert, water immiscible solvent as is used for subsequent nitration this may be effected by reaction with an organic acid by heating and removing water by azeotropic distillation, or by reaction with an acid halide, anhydride or ester with or without an acid binding substance. Typical acid radicals commonly met with in the art may be used, such as those derived from carbonic, formic, acetic, chloroacetic, oxalic, benzoic, naphthoic, phthalic, phenyl acetic, phenoxyacetic, furoic, cyclohexane carboxylic, benzene sulfonic or paratoluene sulfonic.

Aromatic amines suitable as starting materials for the process of the present invention are the primary amines of the benzene series and their substitution products that have at least one unsubstituted ortho or para position and that give acyl derivatives soluble in organic water immiscible inert solvents. Such amines are, for example, halogenated anilines, alkyl, aralkyl, aryl, nitro, alkoxy, aralkoxy and aryloxy substituted anilines, including those containing different kinds of substituents such as, for example, halogen-alkoxy, alkyl-alkoxy and alkyl-nitro derivatives.

The inert water immiscible organic solvents employed in the present invention are those which are described in the art as substantially insoluble in water and are substantially inert to the action of nitric acid under the conditions at which they are employed. Whereas, under more stringent conditions, for example, at higher temperature, or in the presence of mixed acid, they may be nitrated, they are unaffected under the conditions of the present process. The amount of the organic solvent to be employed is not critical, but enough must be used to dissolve sufficient acylarylide at the start so that the reaction proceeds rapidly. Any undissolved arylide goes into solution as the reaction proceeds.

Typical organic solvents which are suitable for the process of the present invention are, for example; carbon tetrachloride, acetylene tetrachloride, nitro-ethane, hexane, cyclohexane, benzene, mono-chlorobenzene, mono-bromobenzene, dichlorobenzenes, mono-nitrobenzene, and decalin. While these organic solvents are operable and useful, mono-chlorobenzene is the preferred solvent for the process of the present invention because of its low cost, low use hazard and ease of recovery.

Nitration of the acylated amines as obtained from the acylation step is accomplished smoothly and readily by appropriately adjusting the temperature of the solution of the acylated aromatic amine and then adding nitric acid. Often it is advantageous to employ an excess of the nitric acid. Strength of the nitric acid to obtain optimum results will vary in individual cases, and often a dilute nitric acid is suitable. For the most part, nitration is carried out at temperatures not exceeding 80° C.

In many cases when nitration is complete the acylnitroarylide precipitates from solution because of low solubility in the organic solvent. In these cases the nitro compound may be isolated by simple filtration. In other cases, because of higher solubility in the organic solvent, the nitro compound is isolated by addition of water, neutralization of excess acidity and removal of the organic solvent by steam distillation. In this manner the organic solvent is practically quantitatively recovered in pure state and the nitro compound remains behind insoluble in water from which it is readily isolated. Often the acylated nitroarylide is to be converted to the free amine, in which case acid or alkali is added to the hot water slurry after steam distillation, and hydrolysis is carried out. Thus, without any isolation, and in one vessel, the three steps of acylation, nitration and hydrolysis are accomplished.

The present invention presents the advantages of using a single solvent with nitric acid alone without loss of solvent which results when water miscible solvents are used; the preferred solvents are also much cheaper. Recovery of the solvents in pure state by simple steam distillation is a further advantage. In addition it should be noted that the present invention is applicable to the production of compounds in the preparation of which the customary processes are inoperative. For example, the usual mixed acid nitration procedure cannot be used with 2-acetyl-amino-4-chlorphenyl isopropyl ether because the ether group is destroyed. When a water immiscible solvent such as monochlorobenzene is used with nitric acid alone the reaction proceeds smoothly and the desired product is obtained.

The invention will be described in greater detail in conjunction with the following specific examples. The parts are by weight.

*Example 1*

170.5 parts of o-toluidine are dissolved in 675 parts of monochlorobenzene and the resulting solution is stirred together with a solution of 80 parts of sodium hydroxide dissolved in 80 parts water. 304 parts of p-toluene sulfonyl chloride are added over a period of several hours and the resulting slurry stirred until reaction is complete. The reaction mixture is then neutralized with hydrochloric acid and the p-toluene sulfon o-toluidide put into solution in the mono-chlorobenzene by heating to 50° C. The aqueous layer is then separated and the resulting mono-chlorobenzene solution which contains 391 parts of p-toluene sulfon o-toluidide is used directly for the nitration.

One part of the dioctyl ester of sulfo-succinic acid is dissolved in the above solution and 147.6 parts of 80% nitric acid are then run in over one-half hour, the temperature being held at 50° C. The reaction is preferably initiated by the addition of one part of finely powdered sodium nitrite during the first part of the nitric acid addition, but this is not necessary. Following the addition of the nitric acid, the reaction mixture is stirred and cooled to 15° C. The heavy precipitate of p-toluene sulfon-2′-methyl-4′-nitranilide is filtered and washed free of acid with water.

If it is desired to prepare the free nitroamino compound, instead of filtering the acylnitro compound, the mono-chlorobenzene is removed by steam distillation and the resulting water suspension is treated with sulfuric acid for one hour at 80° C. The reaction mixture is diluted with a mixture of ice and water, the acidity reduced by the addition of caustic soda and the resulting slurry of 2-amino-5-nitro-toluene filtered and dried.

*Example 2*

24.6 parts of ortho-anisidine are dissolved in 100 parts of monochlorobenzene and 21.4 parts of acetic anhydride run in with stirring over one-half hour, the temperature rising to 65° C. The reaction is stirred at this temperature for 2½ hours and the temperature then allowed to drop to 40° C. 47.0 parts of 42° Bé. nitric acid are then run in, the temperature being held at 40° C. by the rate of addition and by means of a cooling bath. Following the addition, the reaction mixture is stirred and the temperature allowed to drop to 30° C. The heavy precipitate of 2-acetyl-amino-5-nitro-anisole is filtered with suction, washed free of acid with water and dried. It is a very pure product which melts at 153.5–154.5° C.

By carrying out the nitration at 30° C. and cooling to 20° C. before filtering a mixture of the 5- and 4-nitro isomers is precipitated. This is filtered, washed free of acid with water and dried. It melts at 138–148° C. and consists principally of the 5-nitro isomer.

If it is desired to prepare the free nitroamino compound, the 2-acetylamino-5-nitro-anisole may be hydrolyzed in any suitable manner and the 2-amino-5-nitro-anisole isolated.

It is also possible to use the p-toluene sulfon derivative, prepared from o-anisidine and p-toluene sulfonyl chloride, in place of the acetyl compound. In this case, a pure p-toluene sulfon-2′-methoxy-4′-nitroanilide precipitates in good yield and is isolated by filtering and washing free of acid with water. This may be hydrolyzed by stirring in 85% sulfuric acid at 80° C. for a short time, drowning in water and neutralizing with sodium hydroxide. The precipitated 2-amino-5-nitro-anisole is then filtered, washed with water and dried.

*Example 3*

20.8 parts of 2-amino-4-chlor phenetole hydrochloride are stirred in 100 parts of water to a smooth slurry and are neutralized by the addition of soda ash to an alkaline reaction when spotted against brilliant yellow test paper. 125 parts of mono-chlorobenzene are stirred into the neutralized slurry until well mixed, and after allowing to settle, the aqueous layer is separated off and the solution is dried by azeotropic distillation of the little water present with mono-chlorobenzene. When dry, the solution is stirred at 65° C. and 11.2 parts of acetic anhydride are added slowly. The temperature is maintained at 65° C. until reaction is complete.

The temperature is lowered to 50° C. and 11.4 parts of 96.7% nitric acid are dropped in slowly while the solution is stirred efficiently. The temperature is maintained at 50° C. until the reaction is complete, and the slurry of the 2-acetyl-amino-4-chlor-5-nitro phenetole in mono-chlorobenzene is diluted with 300 parts of water and is neutralized through the addition of soda ash until the slurry is no longer acid when spotted against Congo Red test paper.

The mono-chlorobenzene is recovered through steam distillation and when all is removed, the temperature of the resulting slurry in water is lowered to 25° C. At this point, hydrochloric acid is added until the slurry is acid when spotted against Congo Red test paper, and the product is then separated by filtration. The filter cake is washed well with water and then with dilute soda ash solution, and finally with water. The 2-acetylamino-4-chlor-5-nitro phenetole, when pure, melts at 183–184° C.

If desired, this may be converted to the free nitroamino compound by heating the slurry resulting from steam distillation after acidification to complete solution, and then precipitating the 2-amino-4-chlor-5-nitro phenetole by addition of soda ash.

*Example 4*

107 parts of acetic anhydride are run into a solution of 107 parts of p-toluidine dissolved in 800 parts of mono-chlorobenzene and the resulting solution stirred and heated at 65° C. for three hours. The temperature is then dropped to 50° C. and 236.4 parts of 80% nitric acid are run in rapidly, the temperature being held at 50° C. during the addition. The nitration mixture is then drowned in water and the free acid neutralized by the addition of soda ash. The mono-chlorobenzene is steam stripped and the resulting slurry stirred and cooled. The precipitated 3-nitro-4-acetylamino toluene is then filtered and washed well with water.

This product may be hydrolyzed if desired, after removal of mono-chlorobenzene, by adding 500 parts of water and 650 parts of 66° Bé. sulfuric acid and stirring and heating to 100° C. After stirring for one-half hour at this temperature, the solution is cooled to 80° C., clarified with addition of four parts of decolorizing carbon and diluted with water. The resulting slurry is neutralized by the addition of caustic soda and, after stirring and cooling, is filtered. The precipitate of 3-nitro-4-amino toluene is then dried.

*Example 5*

698 parts of a mono-chlorobenzene solution, containing 178 parts of 2-(b-methoxy ethoxy)-5-chloroaniline, are treated at 60° C. with 131 parts of benzoyl chloride during a period of about 40 minutes and the mixture is then allowed to stir down to 35° C. At the latter temperature, the mixture is treated with 147 parts of 24% sodium hydroxide solution during a two hour period and after stirring 45 minutes more at 35° C., the temperature is raised to 65–70° C. and treated with 24% sodium hydroxide solution dropwise until a permanent alkaline test to brilliant yellow paper is obtained. At 65–70° C. the aqueous phase is separated from the mono-chlorobenzene solution of the product by decantation (or any other suitable method, such as by means of a siphon) and the latter is washed with portions of water.

To the washed mono-chlorobenzene, solution of the benzanilide derivative are added 330 parts additional mono-chlorobenzene and the well-stirred slurry is treated at 25° C. with 283 parts of 68% nitric acid in about 45 minutes. After stirring at 25–30° C. for about 20 minutes more, the slurry of nitro compound is cooled to 20° C. and is treated with 300 parts of water. Filtration at this point gives the 1-(b-methoxy ethoxy)- 2-benzoylamino-4-chloro-5-nitrobenzene. The melting point of this product, when pure, is 160–161° C.

In the above preparation, the 2-(b-methoxy ethoxy)-5-chloroaniline is prepared from 1-(b-methoxy ethoxy)-2-nitro-4-chlorobenzene by reduction and its melting point, when pure, is 42–43° C. The nitro compound in turn is prepared by the reaction of nitro p-dichlorobenzene with 2-methoxyethanol and caustic, and its melting point, when pure, is 54.5–55.5° C.

In the above preparation the acylation may be accomplished instead by heating the 2-(b-methoxy ethoxy)-5-chloroaniline in mono-chlorobenzene with benzoyl chloride at 100° C. until evolution of hydrogen chloride essentially ceases. The resulting benzoylamino compound is then directly nitrated in the mono-chlorobenzene solution as described above.

*Example 6*

315 parts of 2-amino-4-chloro-anisole are dissolved in 1,740 parts of mono-chlorobenzene at 65° C. At this temperature, 214 parts of acetic anhydride are slowly run in, time required for the addition being about one hour. When addition is complete, stirring is maintained for an additional two hours at 65° C.

The temperature is now lowered to 50° C. and 228 parts of 96.7% nitric acid are run in slowly during a period of about one hour. The temperature is maintained at 50° C. during this addition. When addition is complete, the temperature is maintained at 50° C. for an additional two hour period.

The temperature is then lowered to 25° C. and 2,000 parts of water and 116 parts of soda ash are added so that the resultant slurry shows a negative test when spotted against Congo Red test paper. 20 parts of sodium acetate are added to the slurry and then the mono-chlorobenzene is recovered by steam distillation.

When steam distillation is completed, the temperature of the resultant slurry is lowered to 25° C., and 75 parts of hydrochloric acid (1.19) are added so that the solution is acid when spotted against Congo Red test paper. The solid 2-acetylamino-4-chloro-5-nitro-anisole is separated by filtration. The filter cake is washed with 1,000 parts of 3% hydrochloric acid, then with 3,000 parts of water, then with 1,000 parts of 5% soda ash solution, and finally with 6,000 parts of water.

The filter cake is dried at 65–70° C.

The above process may also be carried out, employing mono-nitrobenzene in place of the mono-chlorobenzene, as described.

*Example 7*

107 parts of acetic anhydride are run into a solution of 123 parts of para-anisidine in 1,000 parts of mono-chlorobenzene and the resulting solution stirred and heated at 65° C. for three hours. The temperature is then dropped to 40° C. and 195.4 parts of 80% nitric acid are run in over approximately one-half hour, the temperature being held at this point throughout the addition. The reaction goes more smoothly if one part of powdered sodium nitrite is added during the first part of the addition. The reaction mixture is stirred one-half hour after the nitric acid addition and then drowned by running in approximately 1,000 parts of water. The excess acid is neutralized by the addition of soda ash and the mono-chlorobenzene removed by steam stripping. The remaining slurry is stirred, cooled; the precipitated 3-nitro-4-acetylamino anisole is filtered and washed well with water.

The nitration product may be hydrolyzed if desired by adding to the water solution after steam distillation 430 parts of 66° Bé. sulfuric acid and stirring and heating one hour at 100° C. The resulting solution is cooled to 80° C. and clarified by the addition of 5.0 parts of decolorizing carbon. It is then filtered and diluted with water. The resulting slurry is made neutral by the addition of caustic soda and the heavy precipitate of 3-nitro-4-amino anisole filtered and dried.

*Example 8*

A solution comprising 335 parts of monochlorobenzene and 28 parts of 2-acetylamino-4-chlorophenyl isopropyl ether (prepared from the corresponding amine by acetylation in monochlorobenzene with acetic anhydride) is stirred at a temperature of 50° C. and 7.5 parts of 96.7% nitric acid are run in slowly during 30 minutes. The temperature is maintained at 50° C. during addition. When addition is complete the mixture is stirred for an additional 1½ hour period at 50° C. Then 200 parts of water are added, followed by 77 parts of 10% sodium carbonate solution in portions. At this point a sample of the nitration mixture gives negative tests when spotted against Congo Red test paper and brilliant yellow test paper.

After addition of 25 parts of 20% sodium acetate solution, the mono-chlorobenzene is recovered by steam distillation. The solid 2-acetyl-amino-4-chloro-5-nitrophenyl isopropyl ether is recovered by filtration of the cooled aqueous slurry remaining. The nitro compound, when pure, melts at 92-93° C.

When 2-acetylamino-4-chlorophenyl isopropyl ether is nitrated in strong sulfuric acid solution with a mixed acid in the customary manner, an alkali-soluble material probably 2-acetylamino-4-chloro-5-nitro phenol, is produced instead of the desired 2 - acetylamino - 4 - chloro - 5 - nitro phenyl isopropyl ether.

We claim:

1. A method of producing a nitro acylarylide of the benzene series which comprises reacting a solution of the corresponding amine in a water immiscible inert organic solvent with an acylating agent and nitrating with nitric acid without isolating the acylarylide.

2. A method of producing nitrated amines of the benzene series which comprises reacting a solution of the corresponding amine in a water immiscible inert organic solvent with an acylating agent, nitrating the acylarylide produced in the same solvent without isolation by reaction with nitric acid and removing the solvent and hydrolyzing the acylnitroarylide produced.

3. A method of producing nitrated amines of the benzene series which comprises reacting a solution of the corresponding amine in a water immiscible organic solvent with an acylating agent, nitrating the acylarylide produced in the same solvent without isolation by reaction with nitric acid and removing the solvent by steam distillation and hydrolyzing the acylnitroarylide produced.

4. A method according to claim 1 in which the water immiscible organic solvent is monochlorobenzene.

5. A method according to claim 2 in which the water immiscible organic solvent is monochlorobenzene.

6. A method according to claim 1 in which the acylating agent is acetic anhydride.

7. A method according to claim 1 in which the acylating agent is p-toluene sulfonyl chloride.

8. A method according to claim 1 in which the acylarylide is a 2-acetylamino-4-chlorophenol ether.

9. A method according to claim 1 in which the acylarylide is acetyl o-anisidine.

10. A method according to claim 1 in which the acylarylide is p-toluene sulfonyl o-toluidine.

ROBERT PRESCOTT PARKER.
RICHARD FRANKLIN REEVES.
ROBERT CARLAND CONN.

REFERENCES CITED

The following references are of record in the file of this patent:

UNITED STATES PATENTS

| Number | Name | Date |
| --- | --- | --- |
| 1,709,256 | Fischer et al. | Apr. 16, 1929 |
| 1,901,322 | Neelmeier | Mar. 14, 1933 |
| 1,963,597 | Tinker | June 19, 1934 |
| 2,118,494 | Coffey | May 24, 1938 |
| 2,337,825 | Lahr et al. | Dec. 28, 1943 |

FOREIGN PATENTS

| Number | Country | Date |
| --- | --- | --- |
| 57,337 | Germany | May 30, 1891 |
| 349,566 | France | Apr. 3, 1905 |